United States Patent [19]

Nakamura

[11] Patent Number: 4,616,281
[45] Date of Patent: Oct. 7, 1986

[54] DISPLACEMENT DETECTING APPARATUS COMPRISING MAGNETORESISTIVE ELEMENTS

[75] Inventor: Shigekazu Nakamura, Ageo, Japan

[73] Assignee: Copal Company Limited, Tokyo, Japan

[21] Appl. No.: 473,250

[22] Filed: Mar. 8, 1983

[30] Foreign Application Priority Data

| Mar. 10, 1982 | [JP] | Japan | 57-36640 |
| Mar. 10, 1982 | [JP] | Japan | 57-36641 |
| Dec. 17, 1982 | [JP] | Japan | 57-221138 |

[51] Int. Cl.$^4$ .......................... G11B 5/30; G01B 7/14; G01R 33/02
[52] U.S. Cl. .................................. 360/113; 324/207; 324/252; 338/32 R
[58] Field of Search ........ 360/113; 324/252, 207–208; 338/32 R; 323/368

[56] References Cited

U.S. PATENT DOCUMENTS

| 3,860,965 | 1/1975 | Voegeli | 360/113 |
| 3,969,769 | 7/1976 | Gorter et al. | 360/113 |
| 4,021,728 | 5/1977 | Makino et al. | 338/32 R |
| 4,361,805 | 11/1982 | Narimatsu et al. | 338/32 R |
| 4,401,944 | 8/1983 | Narimatsu et al. | 338/32 R |

FOREIGN PATENT DOCUMENTS 0037204 of 1978 Japan.
0037205 of 1978 Japan.
0115257 of 1979 Japan.
0035011 4/1981 Japan.

OTHER PUBLICATIONS

Feng, J. S., "Self-Biased Magnetoresistive Bridge Configuration for Current Measurement", IBM TDB, Apr. 1976, vol. 18, No. 11, pp. 3847–3851.

Primary Examiner—John H. Wolff
Assistant Examiner—David J. Severin
Attorney, Agent, or Firm—Stevens, Davis, Miller & Mosher

[57] ABSTRACT

An apparatus for detecting a displacement of a magnetic sensor including four magnetoresistive elements with respect to a magnetic record medium having a magnetic track on which a magnetization pattern has been recorded with a given pitch is disclosed. First and second magnetoresistive elements are arranged side by side in a direction perpendicular to the direction of the magnetization pattern, and third and fourth magnetoresistive elements are arranged on the first and second magnetoresistive elements, respectively via insulating layers. The first and third magnetoresistive elements are mutually biased magnetically and second and fourth magnetoresistive elements are mutually biased magnetically. The first, second, third and fourth magnetoresistive elements are connected into a bridge circuit and diagonal points of the bridge circuit are connected to positive and negative inputs of a differential amplifier. A detection output signal representing the detected deviation is derived from the differential amplifier as a differential output.

14 Claims, 41 Drawing Figures

FIG._1
PRIOR ART
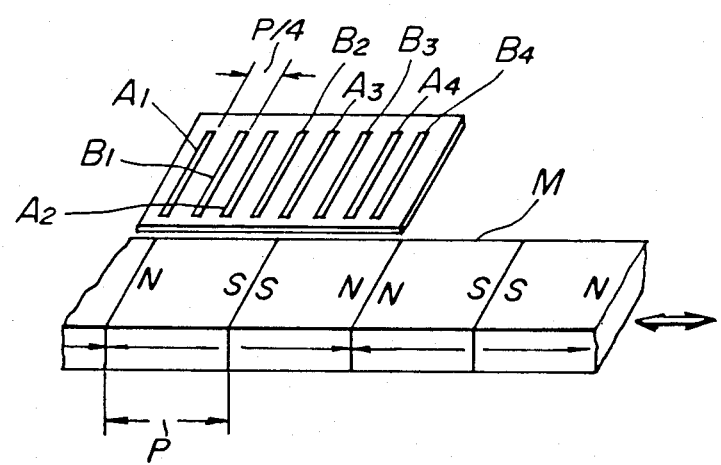
FIG._2
PRIOR ART
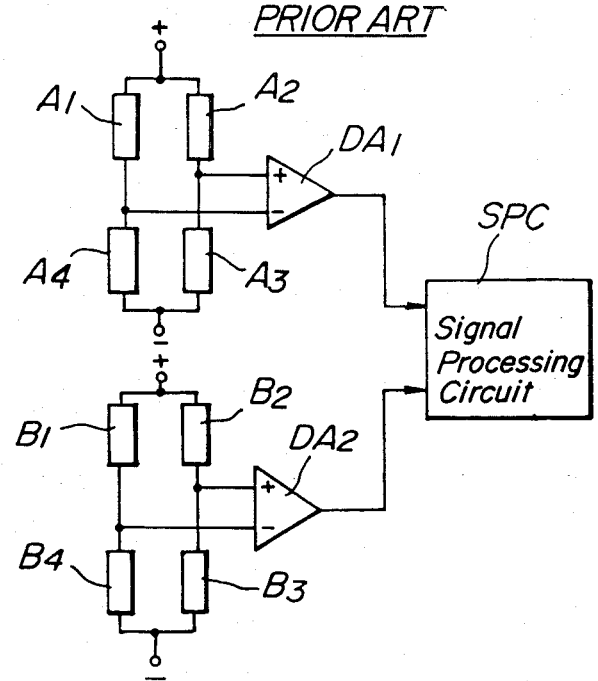

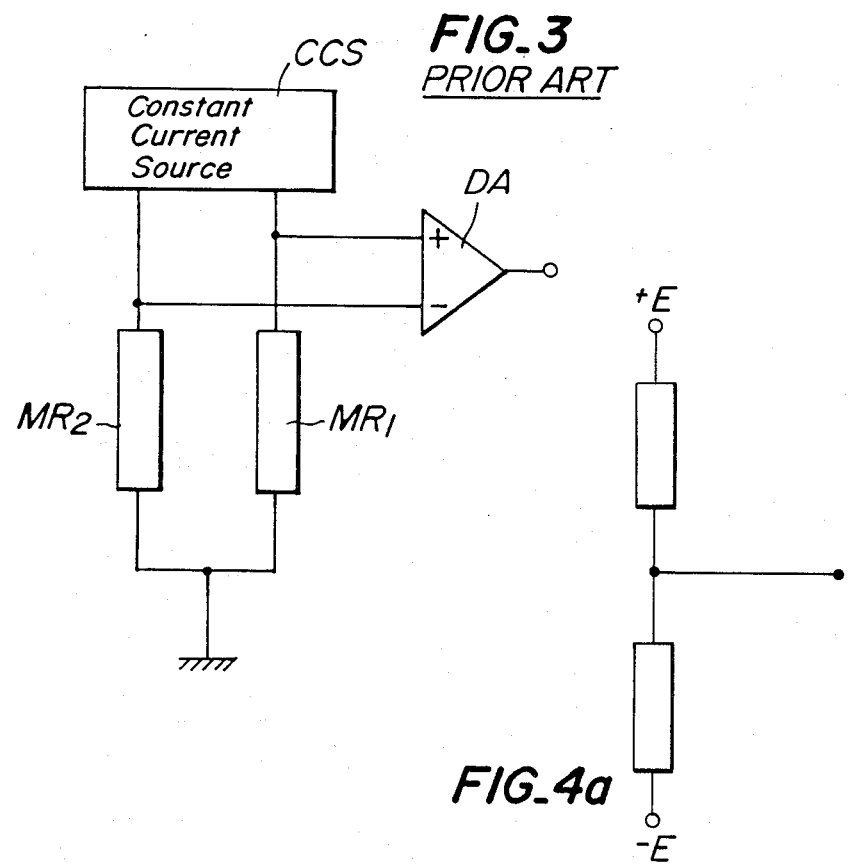
FIG. 3 PRIOR ART
FIG. 4a
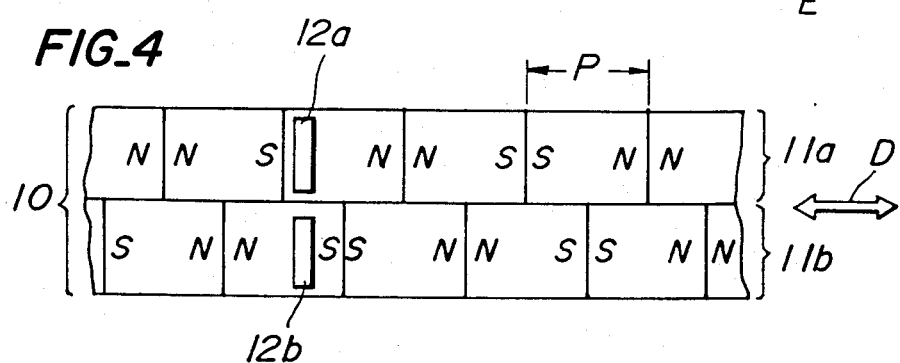
FIG. 4

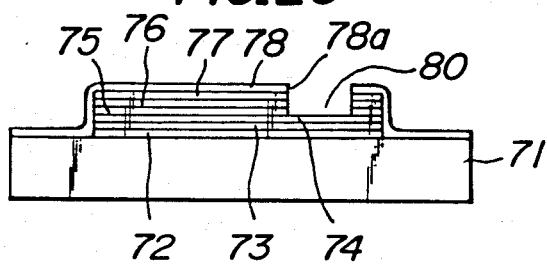
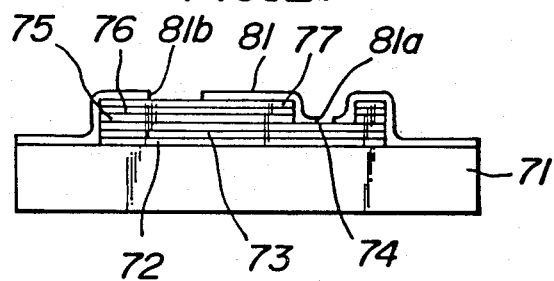
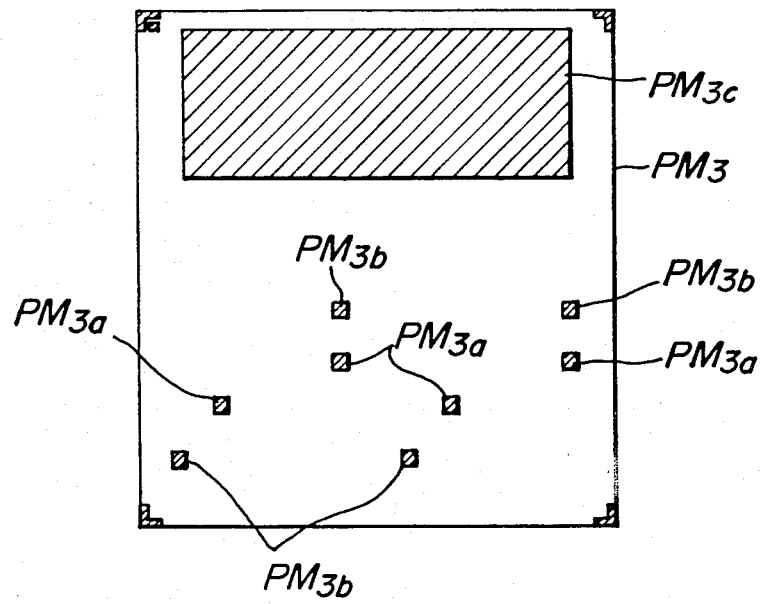

DISPLACEMENT DETECTING APPARATUS COMPRISING MAGNETORESISTIVE ELEMENTS

BACKGROUND OF THE INVENTION

This invention relates to an apparatus for detecting a relative displacement of a magnetic sensor comprising at least two magnetoresistive elements and a magnetic record medium having a magnetization pattern recorded thereon in a direction of displacement.

Such an apparatus can be used as rotary encoder, linear encoder, etc. There has been known a rotary encoder in which a magnetic signal in the form of a magnetization pattern of a constant bit length recorded on a magnetic record medium provided on a disc or cylinder arranged rotatably about a shaft is detected by a magnetic sensor comprising a magnetoresistive element made of ferromagnetic material such as 81% Ni-19% Fe permalloy to detect a rotation angle of the shaft. In such a known rotary encoder, in principle, the magnetic sensor may have a single magnetoresistive element (hereinafter abbreviated as MR element). But in order to obtain a large output voltage without being affected by a drift due to temperature variation, it is usual to provide a plurality of MR elements connected in a differential manner. For instance, in Japanese Patent Laid-open Publication No. 115,257/79, there is disclosed an angle detector comprising two MR elements separated from each other by an integer multiple of a pitch of a magnetization pattern recorded on a magnetic record medium to produce a difference between outputs of the MR elements by means of a differential amplifier. In a Japanese magazine, "Nikkei Electronics", June 22, 1981, page 88, there is also described an angle detector in which two magnetic sensors each having four MR elements $A_1$ to $A_4$; $B_1$ to $B_4$ are provided as shown in FIG. 1. The MR elements of each magnetic sensor are arranged apart from each other by a distance equal to a half of a pitch P of a magnetization pattern recorded on a magnetic record medium M and the MR elements $A_1$ to $A_4$ are shifted by P/4 with respect to the MR elements $B_1$ to $B_4$, respectively. As illustrated in FIG. 2, the MR elements $A_1$ to $A_4$ and $B_1$ to $B_4$ are connected into bridge circuits, respectively and differences between voltages appearing at diagonal points of the bridge circuits are derived by differential amplifiers $DA_1$ and $DA_2$, respectively. Then, the outputs from the differential amplifiers $DA_1$ and $DA_2$ are suitably processed by a signal processing circuit SPC to detect a detection output signal representing the rotation angle as well as the rotational direction. By means of such a differential system, it is possible to obtain the detection output signal having a large amplitude and to remove the influence of drift due to temperature variation. However, in the known angle detectors, it is necessary to arrange a plurality of MR elements in the displacement direction apart from each other by a distance equal to an integer multiple of the magnetization pattern pitch or a reciprocal thereof. If various types of magnetic record medium having magnetization patterns of different pitches are used, there must be prepared various types of magnetic sensors having the MR elements arranged apart from each other by different distances corresponding to the respective pitches, and thus the freedom of design is limited. Moreover, in case that the magnetic record medium is provided on an outer surface of a cylindrical body and a plurality of MR elements are arranged on a flat substrate, distances from the respective MR elements to the record medium become different from each other and therefore, amplitudes of output signals from the MR elements fluctuate and error might be introduced into the differential output. In order to mitigate such a drawback, it has been further proposed to change widths of the respective MR elements as disclosed in Japanese Patent Laid-open Publication No. 35,011/81. However, it is quite cumbersome to manufacture the MR elements having different widths. Moreover, if the distances from the MR elements to the record medium are changed, it is necessary to prepare the MR elements having different widths corresponding to the changed distances. Thus the versatility of such a magnetic sensor is lost. In the known rotation angle detectors, since the MR elements are arranged apart from each other in the direction of the magnetization pattern array, the dimension of the magnetic sensor is liable to be long accordingly and a whole detector is also liable to be large.

In the displacement detector comprising a plurality of MR elements, it has been further known to effect a magnetic bias for the MR elements. For instance, in Japanese Patent Publication No. 37,204/78, there is proposed to arrange a MR element on respective sides of an insulating layer and to bias magnetically one of the MR elements by a magnetic field produced by a driving current passing through the other MR element and vice versa. Hereinafter this type of magnetic biasing is termed as a primary mutual bias system. In Japanese Patent Publication No. 37,205/78, there is disclosed another biasing method in which a magnetic field generated by a driving current passing through one of the MR elements is applied to the other MR element and one component of the magnetization in the other MR element produces a reverse magnetic field which is applied to the one MR element as a biasing magnetic field. This type of biasing is called a secondary mutual bias system. FIG. 3 shows a circuit diagram of a magnetic detector disclosed in the above mentioned Japanese Patent Publication No. 37,204/78. First and second magnetoresistive elements $MR_1$ and $MR_2$ arranged on respective sides of an insulating layer are connected in parallel with each other between a constant current source CCS and the earth potential and junction points between the first and second magnetoresistive elements $MR_1$ and $MR_2$ and the constant current source CCS are connected to inputs of a differential amplifier DA to derive a difference between voltages at the junction points.

Such a magnetic detector of mutual bias type is formed by applying, on an insulating substrate, the first magnetoresistive element $MR_1$, the insulating layer and the second magnetoresistive element $MR_2$ successively. In order to produce a stable output signal, it is essential that the first and second magnetoresistive elements have the same magnetic characteristics. In a typical process for manufacturing such a magnetic detector, at first a first magnetoresistive film and a conductive film are applied on the substrate and then these films are shaped into a given pattern by means of a photoetching to form the first magnetoresistive element with a given conductor pattern. Next the insulating layer is applied and further a second magnetoresistive film and a second conductive film are successively applied on the insulating layer. Finally, the second magnetoresistive film and second conductive film are shaped into a given pattern by photoetching to form the second magnetoresistive element $MR_2$ with a given conductor pattern. In such a manufacturing process, since the first and second mgnetoresistive elements $MR_1$ and $MR_2$ are formed by the different magnetoresistive films, it is rather difficult to make various characteristics such as thickness, specific resistance, resistance-temperature coefficient and configuration coefficient of the first and second magnetoresistive elements equal to each other. Moreover, since the first and second magnetoresistive elements are formed by separate patterning steps, their dimensions are liable be different from each other. In this manner, in the known magnetic detector, the first and second magnetoresistive elements have different magnetic characteristics and therefore, an unbalanced output voltage might be generated under a zero magnetic field and further output voltage might drift due to temperature variation.

SUMMARY OF THE INVENTION

The present invention has for its object to provide a displacement detecting apparatus comprising magnetoresistive elements, which apparatus can be commonly used for various type magnetization patterns.

It is another object of the invention to provide a displacement detecting apparatus which can produce a differential output signal without arranging at least two magnetoresistive elements apart from each other in a direction of a magnetization pattern array.

It is another object of the invention to provide a displacement detecting apparatus which can be made very small in size.

It is another object of the invention to provide a displacement detecting apparatus which can derive a differential output signal stably and precisely.

It is still another object of the invention to provide a displacement detecting apparatus which can derive a differential output signal by using magnetoresistive elements having different magnetic characteristics such as thickness, specific resistance and resistance-temperature coefficient.

According to the invention in an apparatus for detecting a relative displacement of a magnetic record medium having at least one magnetic track on which a magnetization pattern is recorded and a magnetic sensor for detecting a magnetic field produced by the magnetization pattern, the improvement comprises at least two magnetoresistive elements provided in said magnetic sensor and shifted from one another in a direction perpendicular to a direction of the magnetization pattern;

means connected to said magnetoresistive elements for deriving two output signals whose phases are shifted from each other; and means connected to said means to produce a differential output signal as a detection output signal representing the relative displacement.

BRIEF DESCRIPTION OF THE DRAWINGS

FIG. 1 is a perspective view showing a known magnetic sensor;

FIG. 2 is a circuit diagram of a known displacement detector having the magnetic sensor shown in FIG. 1;

FIG. 3 is a circuit diagram depicting a known magnetic sensor using a mutual bias system;

FIG. 4 is a plan view illustrating an embodiment of the displacement detecting apparatus according to the invention;

FIG. 4a illustrates the electrical connections between the two element magnetoresistive system shown in FIG. 4;

FIGS. 22, 24, 26, 27, 29, 30 and 32 are cross sections showing successive steps of a method for manufacturing the magnetic sensor shown in FIG. 21A;

FIGS. 23, 25, 28 and 31 are plan views illustrating photomasks for use in the manufacturing steps;

DESCRIPTION OF THE PREFERRED EMBODIMENTS

FIG. 4 is a schematic plan view showing an embodiment of the displacement detecting apparatus according to the invention. In the present embodiment, a magnetic record medium 10 comprises two record tracks 11a and 11b on which magnetization patterns are recorded in such a manner that they are relatively shifted from each other by a distance equal to a half of a pitch P of the magnetization patterns. Opposite to the magnetization tracks 11a and 11b are arranged first and second ferromagnetic magnetoresistive elements 12a and 12b which are aligned perpendicularly to a direction shown by an arrow D of the tracks 11a and 11b, i.e. a direction in which the tracks and magnetoresistive elements move relatively.

FIG. 4a shows the first and second magnetoresistive elements 12a and 12b as being connected with each other at one end. Their other ends are connected to positive and negative voltage sources, respectively, as shown. The detection output signal is derived from a junction point between the first and second magnetoresistive elements as the differential output signal.

Figure 5:
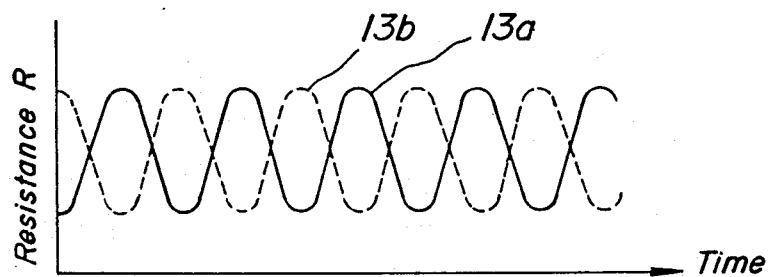
FIG. 5 is a graph showing a resistive change of magnetoresistive elements shown in FIG. 4.
Figure 6:
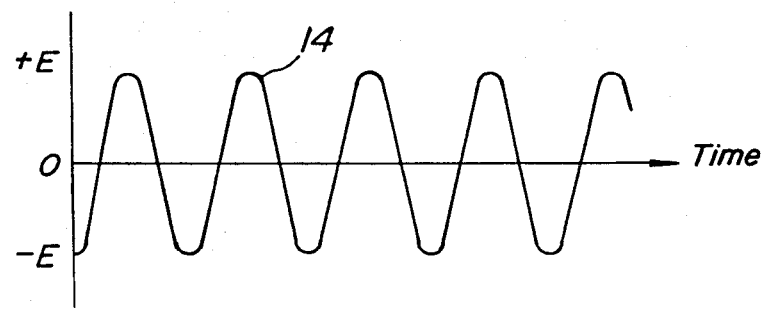
FIG. 6 is a waveform of a detection output signal of the sensor of FIG. 4.

If the magnetic record medium 10 is displaced in the direction D, the magnetic fields applied to the first and second MR elements 12a and 12b vary and thus, resistance values R of the first and second MR elements 12a and 12b change as shown by curves 13a and 13b, respectively in FIG. 5. As can be seen from the curves, the resistance values change in an opposite phase. Therefore, when a difference between output voltages of the first and second MR elements 12a and 12b is derived, it is possible to obtain a differential output voltage as shown by a curve 14 in FIG. 6. In the present embodiment, since the first and second MR elements 12a and 12b are arranged perpendicularly to the direction of the magnetization pattern array, the detection is no more dependent upon the pitch P of the magnetization pattern and therefore the displacement detecting apparatus can be commonly used for various magnetization patterns having different pitches.

Figure 7:
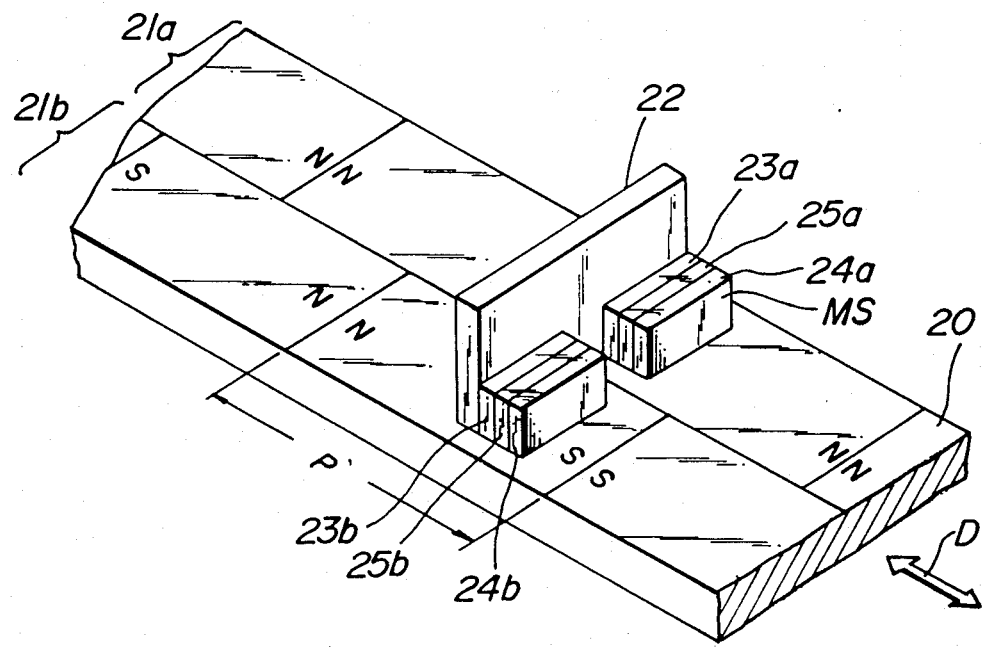
FIG. 7 is a perspective view showing another embodiment of the displacement detecting apparatus according to the invention.
Figure 8:
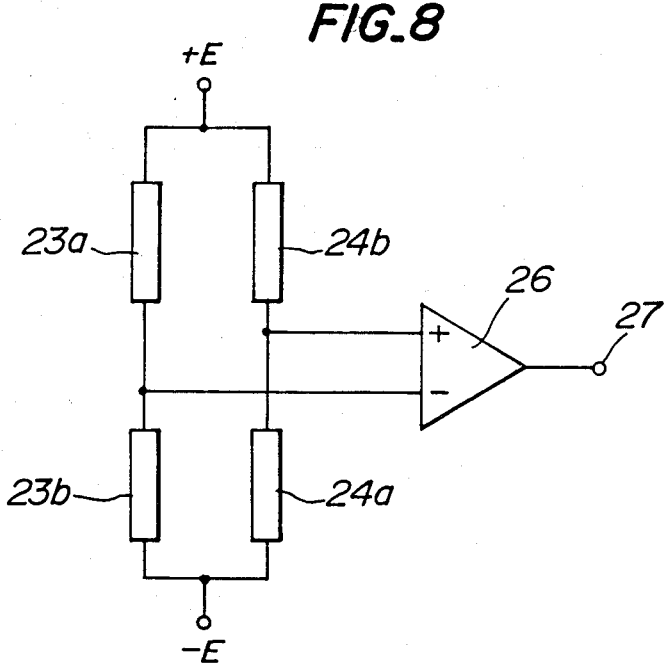
FIG. 8 is a circuit diagram of the apparatus of FIG. 7.

FIG. 7 is a perspective view illustrating another embodiment of the displacement detecting apparatus according to the invention. Also in the present embodiment, a magnetic record medium 20 has recorded thereon first and second magnetization pattern tracks 21a and 21b which are shifted in the direction D by a half of a pitch P of the pattern. Above the record medium 20 is arranged an insulating substrate 22 extending perpendicularly to the direction D as well as to a plane of the record medium 20 and four MR elements 23a, 23b, 24a and 24b are provided on the substrate 22. That is to say, the MR elements 23a and 24a are arranged above the first magnetization pattern track 21a and an insulating layer 25a is arranged between the MR elements 23a and 24a, while the MR elements 23b and 24b and an insulating layer 25b arranged therebetween are positioned above the second record track 21b. The MR elements have major surfaces MS aligned perpendicular to direction D. In FIG. 7, for the sake of clarity, the MR elements and insulating layers are shown as having large thicknesses, but in practice they are very thin. The four MR elements 23a, 23b, 24a and 24b are connected into a bridge circuit as illustrated in FIG. 8. A junction point between the MR elements 23a and 24b is connected to a positive voltage source +E, a junction point of the MR elements 23b and 24A is connected to a negative voltage source −E, a junction point between the MR elements 23a and 23b, is connected to a negative input of a differential amplifier 26 and a junction point between the MR elements 24a and 24b is coupled with a positive input of the differential amplifier 26. By such a construction, a differential output voltage is obtained at an output terminal 27. In the present embodiment, the MR elements 23a, 23b, 24a and 24b are arranged perpendicularly to the plane of the magnetic record medium 20, but they may be arranged in parallel with said plane as in the previous embodiment shown in FIG. 4.

In the displacement detecting apparatus shown in FIG. 7, the substrate 22 may be made of glass, the MR elements 23a, 23b, 24a, 24b may be formed by Fe-Ni alloy (permalloy) films having a thickness of about 500 Å and the insulating layers 25a and 25b may be formed by an insulating film of $SiO_2$ having a thickness of about 1000 to 2000 Å. These films may be simply formed by deposition. In this manner the apparatus according to the invention can be manufactured in a very simple and inexpensive manner.

Figure 9:
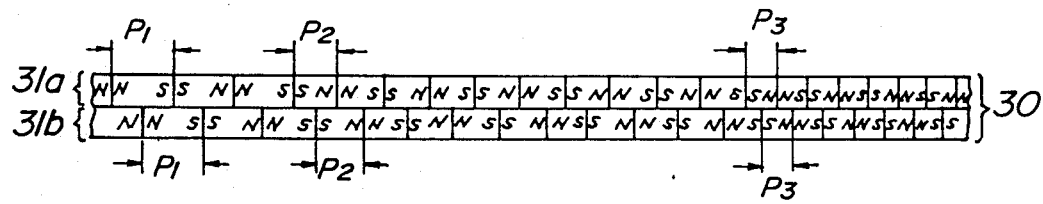
FIGS. 9 and 10 are plan views illustrating magnetic record medium preferably used for the apparatus according to the invention.
Figure 10:
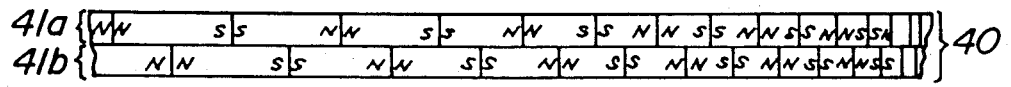

According to the invention, since the MR elements are aligned perpendicularly to the displacement direction D, it is possible to use a magnetic record medium with a magnetization pattern having different or varying pitches. FIG. 9 shows an embodiment of such a magnetic record medium. In this embodiment, the magnetic record medium 30 comprises first and second record tracks 31a and 31b having recorded thereon magnetization patterns having different pitches $P_1$, $P_2$, $P_3$ - - - . Along the record tracks 31a and 31b, the two magnetization patterns are shifted relatively by a distance equal to a half of the pitches. In an embodiment shown in FIG. 10, a magnetic record medium 40 has two record tracks 41a and 41b having recorded thereon and magnetization patterns having continuously changing pitches. Also in this embodiment, the magnetization patterns are shifted by a half of the respective pitches. In the known magnetic sensor, these magnetic record media shown in FIGS. 9 and 10 could never be used. It is very advantageous to use such magnetic record media in case of changing a detection accuracy during the displacement.

In the embodiments so far explained, the MR elements arranged perpendicularly to the magnetization pattern array are not magnetically biased, but there is obtained a differential output due to the arrangement of the two magnetic tracks having the magnetization patterns recorded thereon with 180° phase shift. In embodiments of the displacement detecting apparatus according to the invention to be explained hereinbelow, use is made of a single magnetic track above which at least two magnetoresistive elements are arranged perpendicularly to the magnetization pattern recorded on the magnetic track to derive a differential output. To this end, the magnetoresistive elements are magnetically biased in opposite directions.

Figure 11:
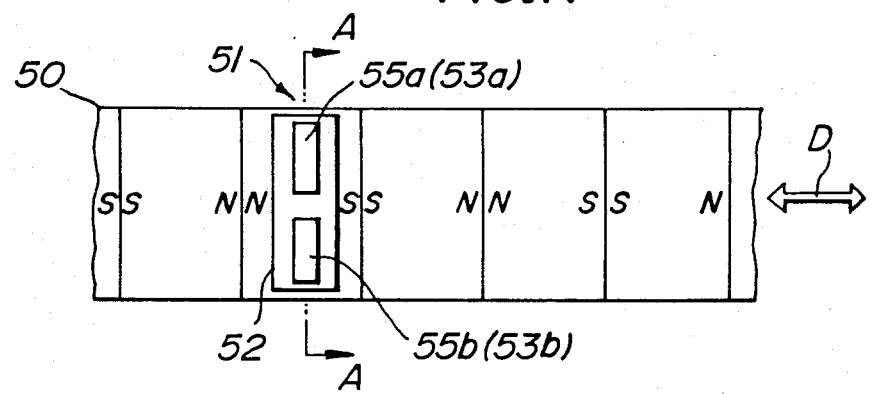
FIG. 11 is a plan view showing another embodiment of the displacement detecting apparatus according to the invention.
Figure 12:
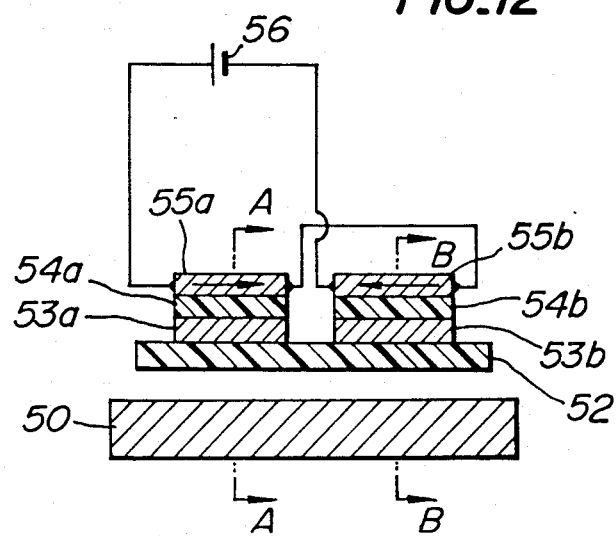
FIG. 12 is a cross section cut along a line A—A in FIG. 11.
Figure 13A:
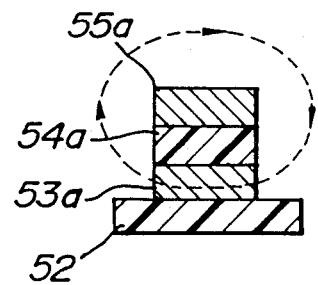
FIGS. 13A and 13B are cross sections cut along lines A—A and B—B, respectively in FIG. 12.
Figure 13B:
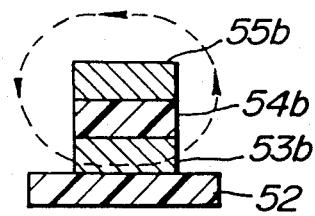

FIG. 11 is a plan view showing an embodiment of the displacement measuring apparatus according to the invention comprising two magnetoresistive elements magnetically biased in opposite directions. A magnetic record medium 50 has a magnetization pattern recorded thereon with a given pitch P and is secured to a member whose displacement is to be detected. A magnetic sensor 51 is arranged above the record medium 50. As best shown in FIG. 12, the magnetic sensor 51 comprises an insulating substrate 52, a pair of magnetoresistive elements 53a and 53b made of ferromagnetic material. These MR elements 53a and 53b are aligned in a direction perpendicular to the direction of the magnetization pattern on the record medium 50, i.e. a displacement direction illustrated by an arrow D. In the present embodiment, in order to bias magnetically the MR elements 53a and 53b in opposite directions, the magnetic sensor 51 further comprises insulating layers 54a and 54b applied on the MR elements 53a and 53b, respectively and conductive layers 55a and 55b applied on the insulating layers 54a and 54b, respectively. The conductive layers 55a and 55b are connected to a D.C. voltage source 56 so as to flow a biasing current through the MR elements 53a and 53b in opposite directions shown by arrows in FIG. 12. FIGS. 13A and 13B are cross sections cut along lines A—A and B—B, respectively in FIG. 12. In the first conductive layer 55a, since the current passes backwardly with respect to a plane of the drawing of FIG. 13A, so that there is produced a biasing magnetic field in the clockwise direction about the conductive layer 55a. Therefore, the MR element 53a is magnetically biased in the leftward direction in FIG. 13A. Contrary to this, in the conductive layer 55b, since the current passes forwardly with respect to a plane of the drawing of FIG. 13B, there is generated a biasing magnetic field in the counter-clockwise direction about the conductive layer 55b and therefore, the MR element 53b is biased magnetically in the rightward direction in FIG. 13B. In this manner, the two MR elements 53a and 53b are magnetically biased in opposite directions.

Figure 14:
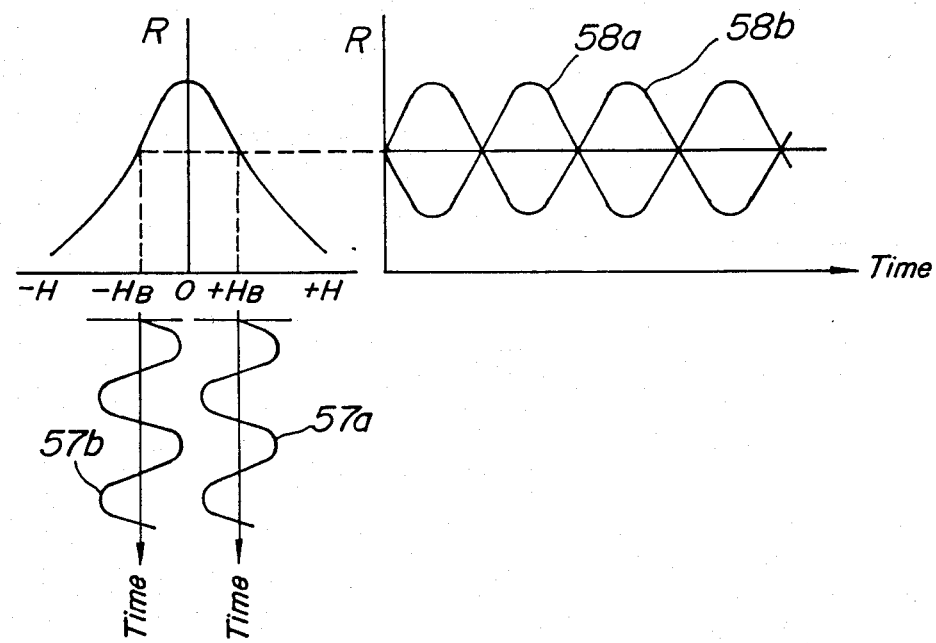
FIG. 14 shows waveforms for explaining the operation of the apparatus shown in FIG. 11.
Figure 15:
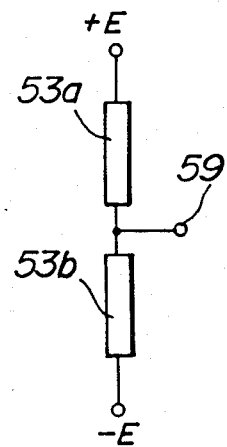
FIG. 15 is a circuit diagram of the apparatus of FIG. 11.
Figure 16:
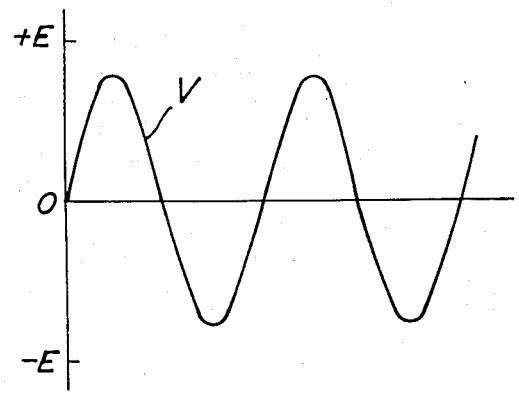
FIG. 16 is a waveform of a detection output signal of the apparatus shown in FIG. 11.

In FIG. 14, curves 57a and 57b show magnetic fields applied to the MR elements 53a and 53b, respectively and these magnetic fields are composed of the biasing magnetic fields $\pm H_B$ and magnetic fields due to the magnetic pattern recorded on the magnetic record medium 50. Then, resistance values R of the MR elements 53a and 53b change as shown by curves 58a and 58b, respectively. It is preferable that the magnitudes of the biasing magnetic fields $\pm H_B$ are so selected that operating points of the MR elements 53a and 53b are situated substantially at middle points on linear portions opposite to each other of magnetic-resistance characteristic curves of the MR elements 53a and 53b, respectively. As depicted by the curves 58a and 58b, the resistance values R of the MR elements 53a and 53b change in opposite phase. Therefore, when the MR elements 53a and 53b are connected in series with each other and the series circuit is connected between positive and negative voltage sources +E and —E as shown in FIG. 15, it is possible to obtain a differential output signal from a junction point 59 between the MR elements 53a and 53b as shown by a curve V in FIG. 16.

In the present embodiment, since the conductive layers 55a and 55b are connected to the D.C. voltage source 56 in series therewith, any variation of the voltage source 56 equally influences the biasing magnetic fields applied to the MR elements 53a and 53b, the variation is cancelled out in the differential output V.

Figure 17:
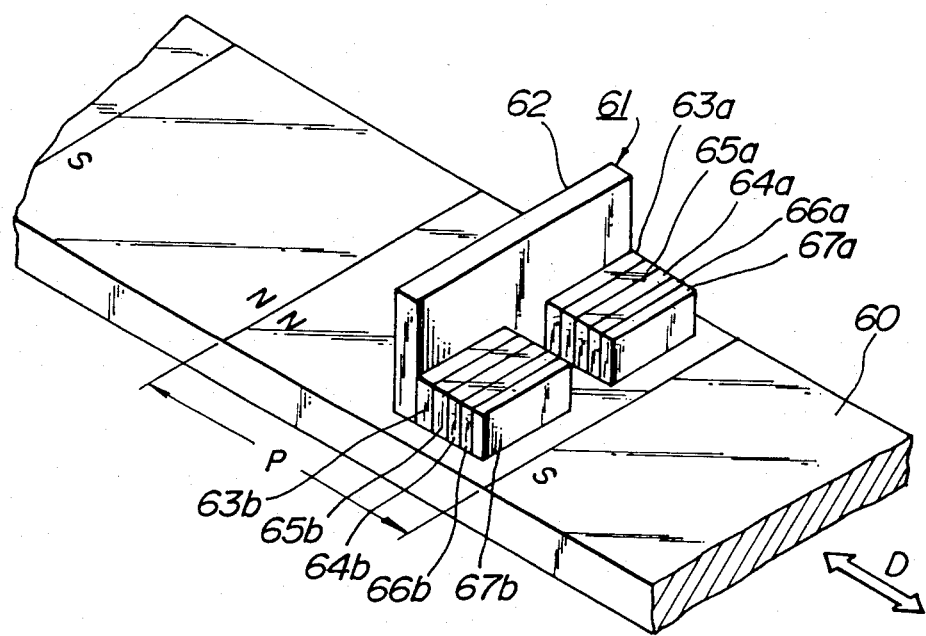
FIG. 17 is a perspective view illustrating another embodiment of the displacement detecting apparatus according to the invention.

FIG. 17 is a perspective view showing another embodiment of the displacement detecting apparatus according to the invention. In this embodiment, above a magnetic record medium 60 having a magnetization pattern recorded thereon is arranged a magnetic sensor 61 comprising an insulating substrate 62 which is arranged perpendicularly with respect to a plane of the record medium 60. On the substrate 62 are arranged first and second MR elements 63a and 63b which are aligned side by side perpendicularly to the displacement direction D. On the MR elements 63a and 63b are arranged third and fourth MR elements 64a and 64b via thin insulating layers 65a and 65b, respectively. In order to effect the magnetic bias for the MR elements 63a, 63b, 64a and 64b, on the MR elements 64a and 64b are applied conductive layers 67a and 67b via thick insulating layers 66a and 66b, respectively. The conductive layers 67a and 67b are connected in series with a D.C. voltage source the same as in the previous embodiment to bias magnetically the MR elements 63a, 64a and 63b, 64b in opposite directions.

Figure 18:
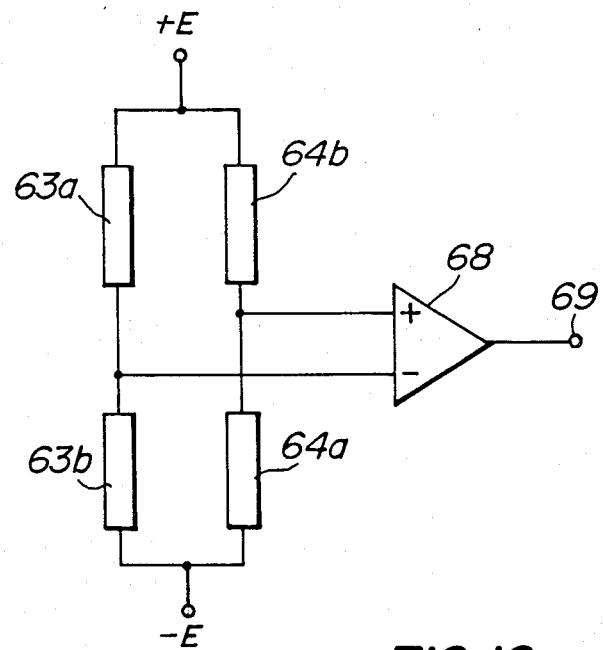
FIG. 18 is a circuit diagram of the apparatus shown in FIG. 17.

The four MR elements 63a, 63b, 64a and 64b of the magnetic sensor 61 are connected into a bridge circuit as illustrated in FIG. 18. A junction between the MR elements 63a and 64b is connected to a positive voltage source +E, a junction between the MR elements 63b and 64a is connected to a negative voltage source —E, and junctions between the MR elements 64a and 64b and between the MR elements 63a and 63b are coupled with positive and negative inputs of a differential amplifier 68, respectively. Then, at an output 69 of the differential amplifier 68 is generated a differential output signal.

In the magnetic sensor 61 shown in FIG. 17, the MR elements 63a, 63b, 64a and 64b are formed by Fe-Ni alloy (permalloy) films having a thickness of 1000 to 2000 Å applied on the glass substrate 62, the thin insulating layers 65a, and 65b may be formed by an evaporated film of $SiO_2$ having a thickness of 1000 to 2000 Å, the thick insulating layers 26a and 26b may be formed by an $SiO_2$ film having a thickness of several microns, and the conductive layers 67a and 67b may be formed by an evaporated film of non-magnetic material such as Al, Au and Cu having a thickness more than 1000 Å.

Figure 19:
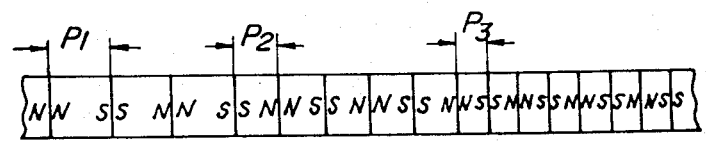
FIGS. 19 and 20 are plan views showing still another embodiments of the magnetic record medium preferably used for the apparatus according to the invention.
Figure 20:
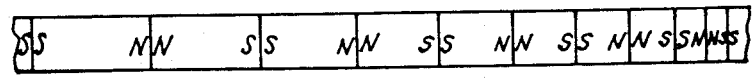

In the above explained magnetic sensors having at least two MR elements magnetically biased in opposite directions, since the MR elements are aligned in the direction perpendicular to the direction of the magnetization pattern recorded on the magnetic record medium, the magnetic sensors may be commonly used for any magnetization patterns having arbiterary pitches. Therefore, a magnetic record medium having recorded thereon a magnetization patterns of different pitches $P_1$, $P_2$ $P_3$ - - - as shown in FIG. 19 and a magnetic record medium having a magnetization pattern of a continuously varying pitch as illustrated in FIG. 20 may be preferably used.

In the embodiments shown in FIGS. 11 and 17, in order to bias magnetically the MR elements in the opposite directions there are provided the conductive layers and the biasing D.C. current is passed through the conductive layers. According to the invention, the magnetic bias can be performed by means of the mutual bias systems. In such a case, it is not necessary to provide the conductive layers and D.C. voltage source for generating the bias current.

Figure 21A:
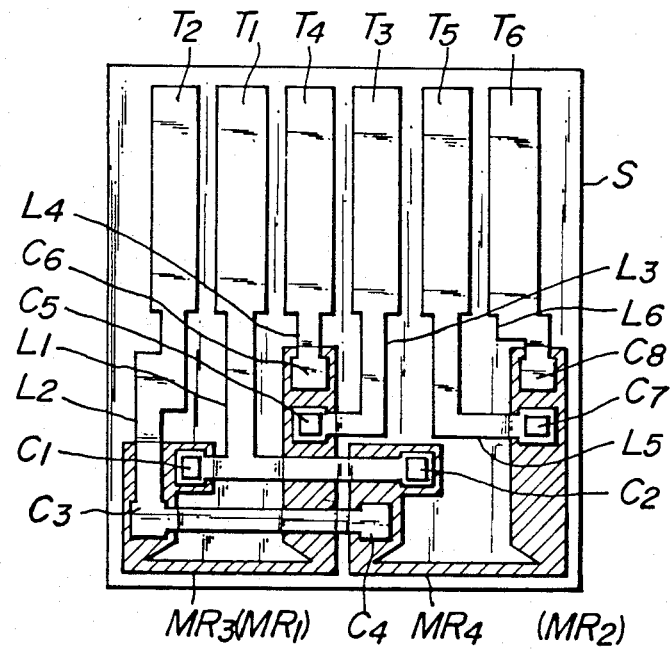
FIGS. 21A, 21B and 21C show still another embodiment of the magnetic sensor of the displacement detecting apparatus according to the invention.
Figure 21B:
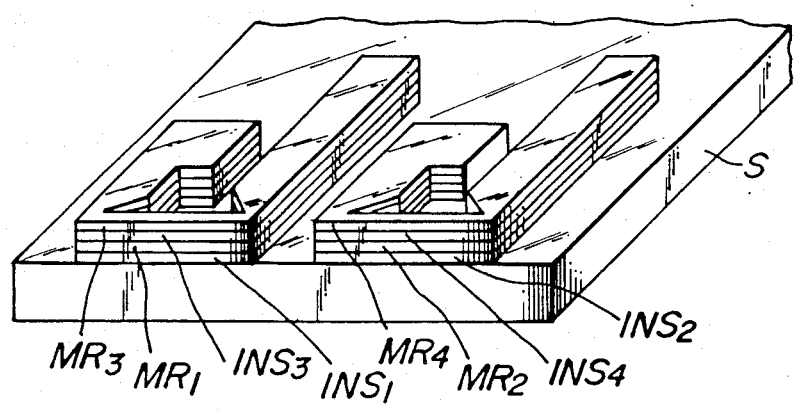
Figure 21C:
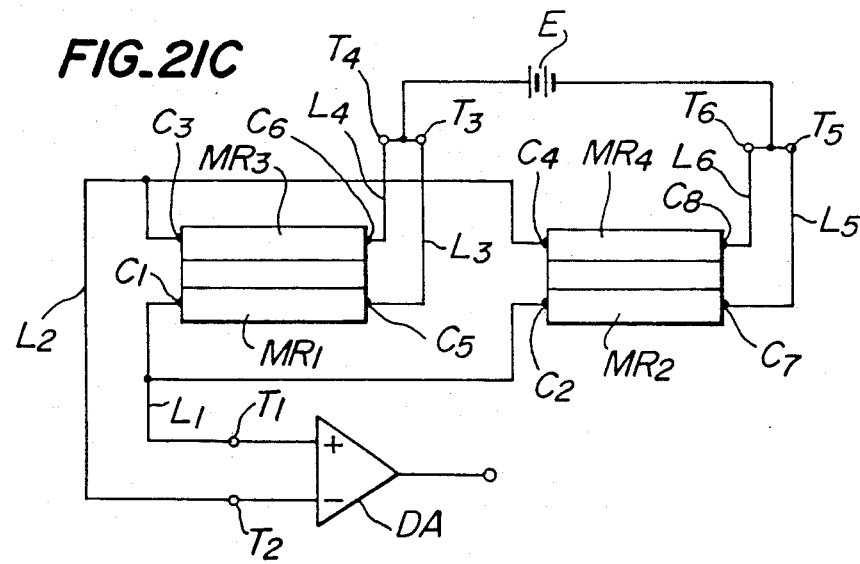

FIGS. 21A to 21C illustrate an embodiment of the displacement detecting apparatus according to the invention in which four magnetoresistive elements are magnetically biased by means of the mutual bias system. In FIG. 21A, uppermost insulating layers are omitted and in FIG. 21A the magnetoresistive elements are shown by hatching for the sake of clarity. The magnetic sensor comprises a substrate S made of silicon and two MR elements $MR_1$ and $MR_2$ are arranged on the substrate S via insulating layers $INS_1$ and $INS_2$, respectively. These MR elements $MR_1$ and $MR_2$ are formed by patterning a single magnetoresistive film. The remaining MR elements $MR_3$ and $MR_4$ are provided on the MR elements $MR_1$ and $MR_2$ via insulating layers $INS_3$ and $INS_4$, respectively. These MR elements $MR_3$ and $MR_4$ are also formed by patterning another single magnetoresistive film. The insulating layers $INS_1$, $INS_2$ and $INS_3$, $INS_4$ are also formed by patterning insulating films, respectively. As illustrated in FIG. 21C, the four MR elements $MR_1$ to $MR_4$ are connected into a bridge circuit. That is to say, each of the lower MR elements $MR_1$ and $MR_2$ has one end connected to a conductor $L_1$ at contacts $C_1$ and $C_2$, respectively and the conductor $L_1$ is connected to a terminal $T_1$. Each of the upper MR elements $MR_3$ and $MR_4$ has one end connected to a conductor $L_2$ at contacts $C_3$ and $C_4$ and the conductor L₂ is connected to a terminal T₂. The other end of the lower MR element MR₁ is connected to a terminal T₃ by means of a contact C₅ and a conductior L₃ and the other end of upper MR element MR₃ is coupled with a terminal T₄ via a contact C₆ and a conductor L₄. The other end of the lower MR element MR₂ is connected to a terminal T₅ through a contact C₇ and a conductor L₅ and the other end of the upper MR element MR₄ is coupled with a terminal T₆ by means of a contact C₈ and a conductor L₆. In FIG. 21A, the contacts for the lower MR elements MR₁ and MR₂ are shown by double frames. As illustrated in FIG. 21C, the terminals T₁ and T₂ constitute outputs of the bridge circuit which are connected to inputs of a differential amplifier DA, the terminals T₃ and T₄ are commonly connected to a positive terminal of a voltage source E, and the terminals T₅ and T₆ are connected in common to a negative terminal of the voltage source E. Therefore, the terminals T₃ and T₄ and the terminals T₅ and T₆ may be formed as single terminals, respectively. However, it is quite advantageous to provide the separate terminals as shown in FIG. 21A, because in this construction, the magnetoresistive elements can be checked separately. For instance, the resistance value of the MR element MR₁ can be detected by measuring a resistance between the terminals T₃ and T₁. This results in a higher yield in manufacturing the magnetic sensor comprising a plurality of magnetoresistive elements.

In the present embodiments, the MR elements MR₁ to MR₄ are magnetically biased by means of the secondary mutual bias system. Therefore, the MR elements MR₂ and MR₃ are subjected to a biasing magnetic field directing forwards with respect to a plane of the drawing of FIG. 21C, while the MR elements MR₁ and MR₄ are subjected to a biasing magnetic field directing downwards with respect to the plane of the drawing of FIG. 21C. Thus, there is obtained at an output of the differential amplifier DA a differential output with a higher sensitivity without being influenced by noise.

Now, an unbalanced output of the magnetic sensor will be considered. It is assumed that a specific resistance as a function of temperature T of the first magnetoresistive film constituting the first and second MR elements MR₁ and MR₂ is $\rho_1(T)$, a thickness of the first magnetoresistive film is $t_1$, a specific resistance as a function of temperature of a second magnetoresistive film forming the MR elements MR₃ and MR₄ is $\rho_2(T)$, a thickness of the second magnetoresistive film is $t_2$, a pattern configuration coefficient (i.e. length/width) of the MR elements MR₁ and MR₃ is $k_1$ and a pattern configuration coefficient of the MR elements MR₂ and MR₄ is $k_2$. Then resistance values $R_1$ to $R_4$ of the MR elements MR₁ to MR₄ may be expressed as follows.

$$R_1 = \rho_1(T) \cdot k_1/t_1$$

$$R_2 = \rho_1(T) \cdot k_2/t_1$$

$$R_3 = \rho_2(T) \cdot k_1/t_2$$

$$R_4 = \rho_2(T) \cdot k_2/t_2$$

Then, the unbalanced output voltage ΔV under no magnetic field to be detected can be represented by the following equation, wherein $V_s$ is a voltage of the voltage source E.

$$\Delta V = V_s \cdot \frac{R_2}{R_1 + R_2} - V_s \cdot \frac{R_4}{R_3 + R_4}$$

$$= V_s \cdot \frac{\rho_1(T) \cdot k_2/t_1}{\rho_1(T) \cdot k_1/t_1 + \rho_1(T) \cdot k_2/t_1} - V_s \cdot \frac{\rho_2(T) \cdot k_2/t_2}{\rho_2(T) \cdot k_1/t_2 + \rho_2(T) \cdot k_2/t_2}$$

$$= V_s \left( \frac{k_2}{k_1 + k_2} - \frac{k_2}{k_1 + k_2} \right) = 0$$

From the above equation, it can be concluded that even if $\rho_1(T) = \rho_2(T)$, $t_1 = t_2$ and $k_1 = k_2$, the unbalanced voltage ΔV becomes always zero and therefore, the detection can be performed precisely without being affected by off-set and temperature-dependent drift.

Next, an example of the method of manufacturing the magnetic sensor according to the invention shown in FIG. 21A will be explained in greater detail.

Figure 22:
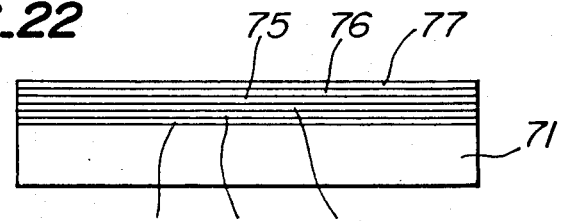

At first, as shown in FIG. 22, on a silicon substrate 71 are deposited successively a first insulating film 72 of Ta₂O₅ having a thickness of 500 Å, a first magnetoresistive film 73 of 81% Ni-19% Fe permalloy having thickness of 300 Å, a second insulating film 74 made of SiO₂ and having a thickness of 1500 Å, a third insulating film 75 of Ta₂O₅ having a thickness of 500 Å, a second magnetoresistive film 76 of Ni-Fe permalloy having a thickness of 300 Å, and a fourth insulating film 77 of SiO₂ having a thickness of 1500 Å. The deposition of these films is carried out, while the substrate 71 is heated at a temperature of 300° C. Since the silicon substrate has an excellent heat radiation property, it is possible to flow a larger current through the MR elements, a detection output signal having a high S/N can be obtained. Further, the silicon substrate is widely used in the semiconductor manufacturing and thus, the silicon substrate having a good quality is easily available. Then, a photoresist film of positive type is applied on the fourth insulating film 77, while the substrate 71 is kept at a temperature of 300° C. As the photoresist film, use may be made of AZ-1350 for dry etching.

Figure 23:
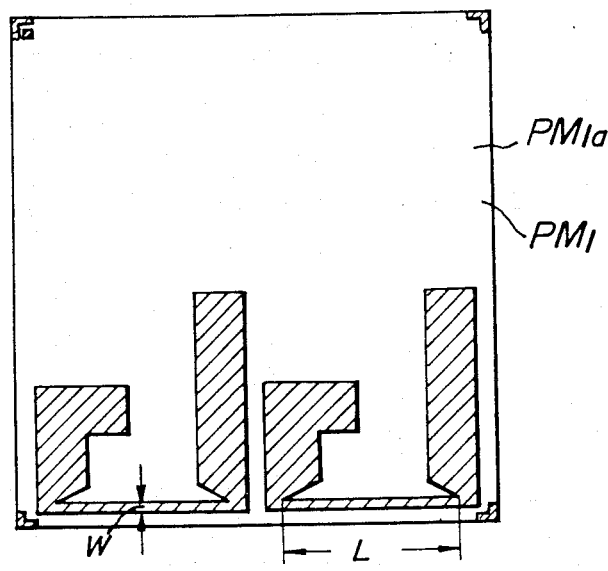

Next, the photoresist film is selectively irradiated by light by means of a photomask PM₁ shown in FIG. 23, which photomask has formed therein a given pattern corresponding to the pattern of the magnetoresistive elements to be formed. Non-hardened portions of the photoresist which are irradiated by light passing through a transparent part PM₁ₐ are removed. In the present embodiment, a length L of the magnetoresistive element is about 1 mm and a width W is 50μ.

Then a dry etching is carried out to remove selectively the films 72 to 77 simultaneously. This etching is effected by means of a mixed gas containing CF₄ gas for removing the insulating films of Ta₂O₅ and SiO₂, CCl₄ gas for attacking the magnetoresistive films of Fe-Ni permalloy, and O₂ gas for supporting the action of CCl₄ gas. Since all the six films 72 to 77 are treated simultaneously by a single etching treatment, the etching step is made simple and the configuration of the two magnetoresistive elements arranged one above the other can be made perfectly identical, so that the characteristics of the magnetoresistive elements can be made equal. Moreover, since the first and second MR elements MR₁ and MR₂ are formed by the first magnetoresistive film 73, and the third and fourth MR elements MR₃ and MR4 are made of the second magnetoresistive film 76, they also have same thicknesses and characteristics.

Figure 24:
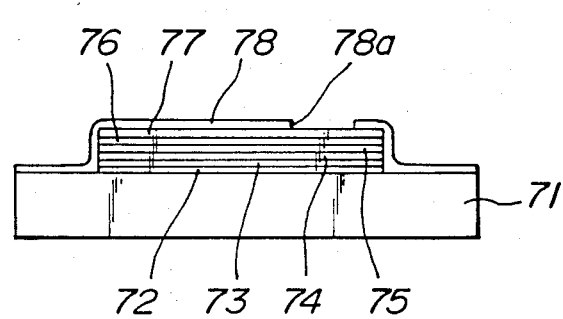
Figure 25:
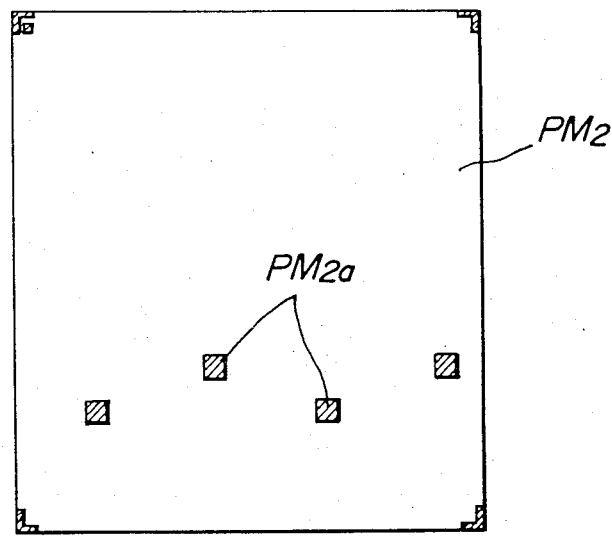
Figure 29:
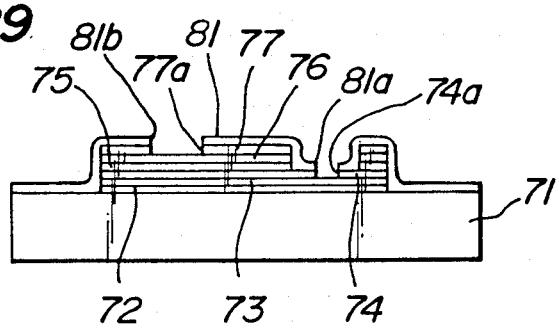

Then, after removing the remaining photoresist, another photoresist film 78 of negative type is applied as shown in FIG. 24. Now, there is formed an opening 78a in the photoresist film 78 by means of a photomask PM2 having opaque portions PM$_{2a}$ illustrated in FIG. 25, these openings corresponding to the contacts for the first magnetoresistive film 73.

Next, an etching treatment is carried out for the fourth insulating film 77, second magnetoresistive film 76 and third insulating film 77 to form a through hole 80 extending upto the second insulating film 74 as illustrated in FIG. 26. Also in this etching treatment, use may be made of dry etching using the mixed gas of CF$_4$, CCl$_4$ and O$_2$ gases. Since this etching is sufficient to be effected until the second insulating film 74 is exposed and the film 74 may be etched more or less, it is not necessary to control the etching strictly. Further, the etching may be effected under the wet etching. In this case, hydrofluoric acid etchant may be used for SiO$_2$, alkalic etchant for Ta$_2$O$_5$ and strong acid mixture etchant may be employed for Fe-Ni permalloy.

Next, as shown in FIG. 27, an insulating photoresist film 81 of negative type is applied. The insulating photoresist film 81 may be made of polyimide photoresist. Then, in the polyimide photoresist film 81 are formed openings 81a and 81b by means of a photomask PM3 shown in FIG. 28. The opening 81a is formed in the bottom of the through hole 80 and opaque portions of the photomask PM3 corresponding to the opening 81a is denoted by PM$_{3a}$ in FIG. 28. Other opaque portions PM$_{3b}$ correspond to the openings 81b. The photomask PM3 further includes a large opaque portion PM$_{3c}$ which serves to remove the insulating photoresist film 81 at a portion where wire bonding will be effected afterward. However, in FIG. 27, an opening corresponding to the opaque portion PM$_{3c}$ is not shown for the sake of simplicity.

Then, the second and fourth insulating films 74 and 77 made of SiO$_2$ are selectively etched through the holes 81a and 81b by means of an etchant which selectively acts upon SiO$_2$, but does not attack Ta$_2$O$_5$. Such an etchant may be formed by hydrofluoric acid etchant such as HF+6NH$_4$F. During this etching treatment, holes 74a and 77a are formed in the SiO$_2$ insulating films 74 and 77, respectively, said holes extending upto the first and second magnetoresistive films 73 and 76, respectively. During the formation of the holes 81a and 81b, since use is made of the etchant selectively attacking SiO$_2$, it is possible to avoid effectively a shortcircuit between the first and second magnetoresistive films 73 and 76 by means of possible pin holes.

Figure 30:
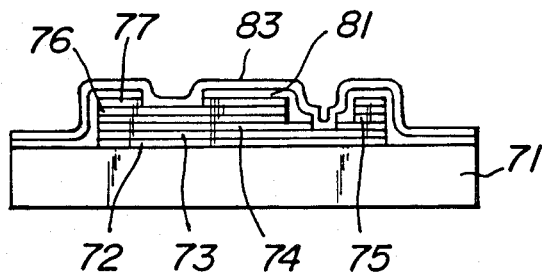

Next, Mo film of 2000 Å thick and Au film of 5000 Å thick are successively deposited on the insulating photoresist film 21 to form a metal film 83 as shown in FIG. 30. During this metal deposition, the substrate 71 is heated at about 250° C.

Figure 31:
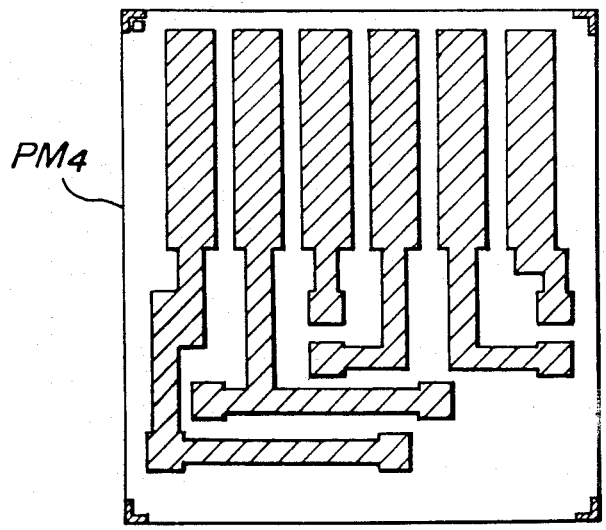
Figure 32:
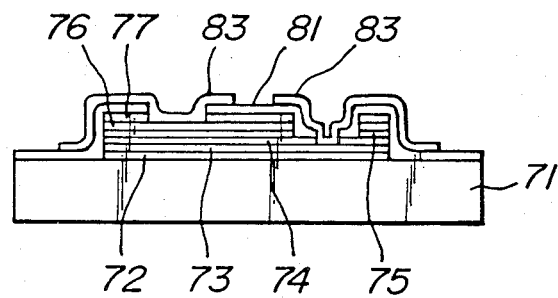

After depositing a photoresist film of positive type over the metal film 83, the metal film 83 is patterned to form a conductive pattern illustrated in FIG. 32 by means of a photomask PM4 shown in FIG. 31. In this manner, the magnetoresistive element chip is formed.

Figure 33:
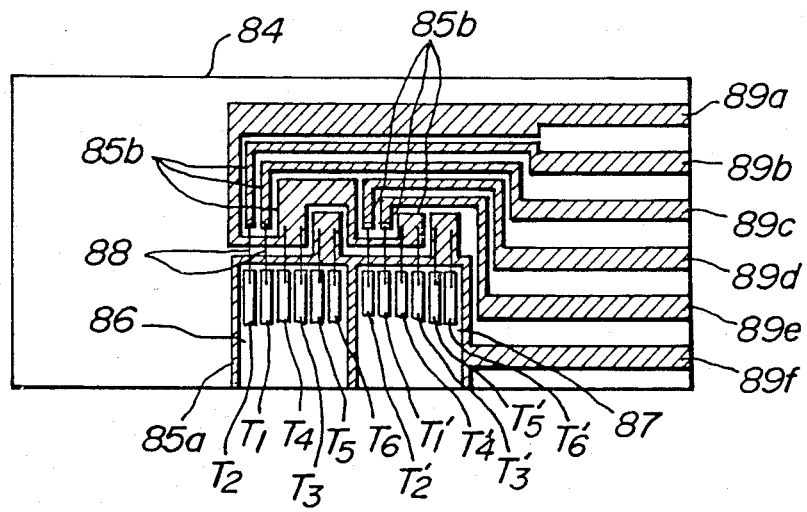
FIG. 33 is a plan view showing another embodiment of the displacement detecting apparatus according to the invention using the magnetic sensor shown in FIG. 21A.
Figure 34:
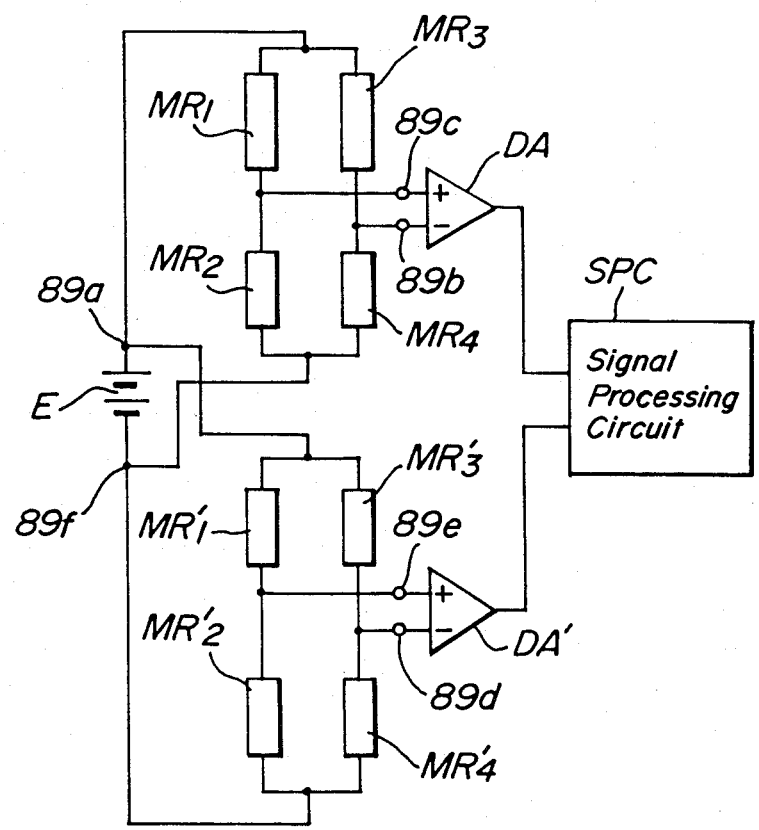
FIG. 34 is a circuit diagram of the apparatus shown in FIG. 33.
Figure 35:
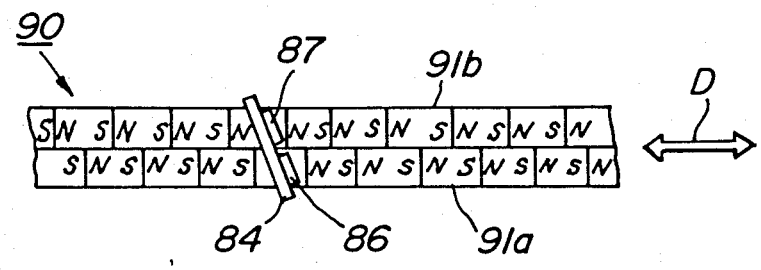
FIG. 35 is a plan view showing the arrangement of the apparatus of FIG. 33 above a magnetic record medium.

Then, as depicted in FIG. 33, two magnetoresistive element chips 86 and 87 are arranged on a board 84. The board 84 comprises an insulating substrate made of glass epoxy and metal portions 85a and 85b formed by patterning a metal film applied on the substrate and consisting of Ni film of 5μ thick and Au film of 1μ thick. The magnetoresistive element chips 86 and 87 are bonded onto the metal portion 85a. Since the metal portion 85a has a very wide area, a heat radiation via the metal portion 85a is enhanced effectively. As explained above, each chips 86 and 87 comprise the four MR elements and the terminals T$_1$ to T$_6$ and T'$_1$ to T'$_6$ of the chips are connected to the metal portions 85b of the board 84 by means of fine metal wires 88. In order to perform the wire bonding effectively, the insulating photoresist film 81 has been removed at a portion underneath the terminals T$_1$ to T$_6$ and T'$_1$ to T'$_6$ as explained above with reference to FIG. 28. The metal portions 85b are connected to terminals 89a to 89f on the board 84 in such a manner that the MR elements MR$_1$ to MR$_4$ on the chip 86 and the MR elements MR'$_1$ to MR'$_4$ on the chip 87 are connected into bridges, respectively as shown in FIG. 34. Then the terminals 89a and 89f of the board 84 are connected to positive and negative terminals, respectively of a D.C. voltage source E, the terminals 89b and 89c of the board 84 are connected to negative and positive inputs, respectively of a first differential amplifier DA, and the terminals 89d and 89e are connected to negative and positive inputs, respectively of a second differential amplifier DA'. Output signals from the differential amplifiers DA and DA' are supplied to a signal processing circuit SPC and are processed therein. As illustrated in FIG. 35, the board 84 comprising the magnetoresistive element chips 86 and 87 is arranged above a magnetic record medium 90 having two magnetization patterns 91a and 91b which are shifted relatively by half a pitch of the magnetization pattern in a direction of the displacement shown by an arrow D. The two magnetoresistive element chips 86 and 87 are aligned in a direction which is substantialy perpendicular to the direction of the magnetization pattern array. Therefore, the signal processing circuit SPC produces a detection output signal representing direction and amount of the displacement.

Figure 36:
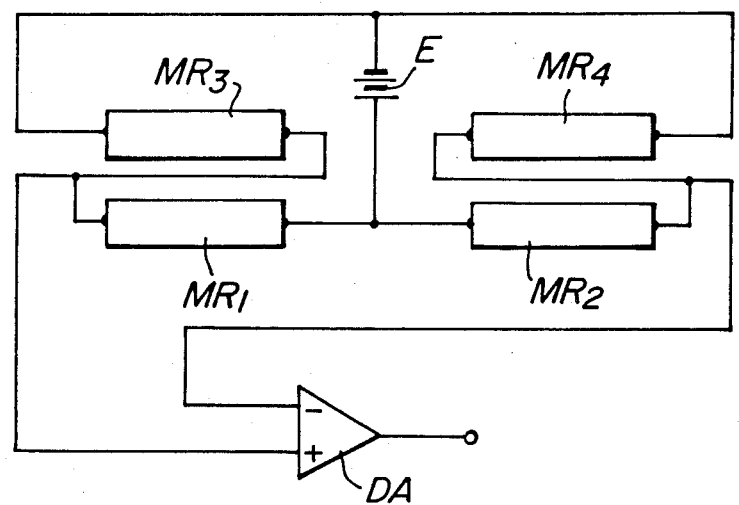
FIGS. 36 and 37 are circuit diagrams showing modified embodiments of the magnetic sensor according to the invention.

FIG. 36 shows another embodiment of the displacement detecting apparatus according to the invention. In the present embodiment, MR elements MR$_1$ and MR$_3$ are connected in series with a D.C. voltage source E and MR elements MR$_2$ and MR$_4$ are connected in series with the voltage source E. Due to the secondary mutual bias system, the first and second MR elements MR$_1$ and MR$_4$ are subjected to a biasing magnetic field directing backwards with respect to a plane of the drawing, whereas the third and fourth MR elements MR$_2$ and MR$_3$ are subjected to a biasing magnetic field directing forwards with respect to the plane of drawing. Then, the unbalanced output voltage ΔV is expressed as follows.

$$\Delta V = V_s \cdot \left( \frac{R_3}{R_1 + R_3} - \frac{R_4}{R_2 + R_4} \right)$$

$$= V_s \left( \frac{\rho_2(T) \cdot k_2/t_2}{\rho_1(T) \cdot k_1/t_1 + \rho_2(T) \cdot k_2/t_2} - \right.$$

$$\left. \frac{\rho_2(T) \cdot k_2/t_2}{\rho_1(T) \cdot k_1/t_1 + \rho_2(T) \cdot k_2/t_2} \right) = 0$$

Therefore, the present embodiment can provide the entirely same functional effect as the embodiment shown in FIG. 21.

Figure 37:
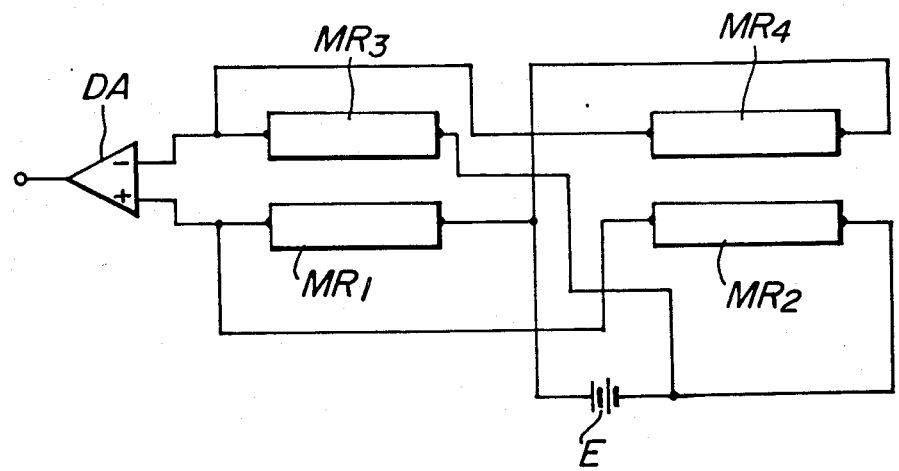

FIG. 37 illustrates still another embodiment of the displacement detecting apparatus according to the invention, in which MR elements $MR_1$ and $MR_2$ are connected in series with a D.C. voltage source E and MR elements $MR_3$ and $MR_4$ are also connected in series with the voltage source E. Therefore, the MR elements $MR_1$ and $MR_3$ are subjected to a biasing magnetic field directing backwards with respect to a plane of the drawing, while the MR elements $MR_2$ and $MR_4$ are subjected to a biasing magnetic field directing toward forwards. Then, the unbalanced output voltage $\Delta V$ can be represented as follows.

$$\Delta V = V_s \left( \frac{R_2}{R_1 + R_2} - \frac{R_3}{R_3 + R_4} \right)$$

$$= V_s \left( \frac{\rho_1(T) \cdot k_2/t_1}{\rho_1(T) \cdot k_1/t_1 + \rho_1(T) \cdot k_2/t_1} - \frac{\rho_2(T) \cdot k_1/t_2}{\rho_2(T) \cdot k_1/t_2 + \rho_2(T) \cdot k_2/t_2} \right)$$

$$= V_s \left( \frac{k_2}{k_1 + k_2} - \frac{k_1}{k_1 + k_2} \right)$$

$$= V_s \cdot \frac{k_2 - k_1}{k_1 + k_2}$$

In general, the configuration coefficients $k_1$ and $k_2$ are not equal to each other and thus, the unbalanced voltage $\Delta V$ is not zero. However, the variation due to temperature is not introduced in the unbalanced voltage $\Delta V$, so that the temperature drift does not occur. Moreover, since the unbalanced voltage $\Delta V$ becomes constant, it can be easily compensated for by an off-set voltage.

In the embodiments so far explained, the insulating films are made of $SiO_2$ and $Ta_2O_5$, but may be constituted by other oxide, fluoride or nitride substances. For instance, $MgF_2$ and $Si_3N_4$ may be used. The etching process may be carried out not only by the dry and wet etchings, but also by sputter etching in Ar gas. Moreover, the insulating photoresist film made of polyimide resin may be removed and another insulating film may be applied. Further, in the above embodiments, the substrate is made of silicon, but it may be composed of ceramics or glass. Further, the selective etching may be effected by using a resist film which is hardened by an irradiation of an electron beam. In such a case the photomasks become unnecessary. Moreover, in the above embodiments, the MR elements are biased magnetically by means of the secondary mutual bias system, but it may be performed by the primary mutual bias system. In the embodiment shown in FIG. 35, the magnetic record medium comprises the two record tracks having the magnetization patterns recorded thereon, but use may be made of a magnetic record medium having a single magnetization pattern. Further, the biasing magnetic field may be produced by arranging a permanent magnet or an electromagnet near the magnetoresistive elements. In the above embodiments, the magnetic record medium is moved with respect to the fixedly arranged magnetic sensor, but the magnetic sensor or both the magnetic sensor and magnetic record medium may be moved.

What is claimed is:

1. In an apparatus for detecting relative displacement between a magnetic record medium having at least one magnetic track on which a magnetization pattern is recorded in a plane of said magnetic record medium and a magnetic sensor for detecting a magnetic field produced by the magnetization pattern, the improvement comprising:

at least two magnetoresistive elements provided in said magnetic sensor and spaced apart from one another and aligned to extend in a direction substantially perpendicular to a direction of the magnetization pattern, a major surface of said magnetoresistive elements being aligned to extend substantially perpendicular to a direction of said relative displacement;

means connected to said magnetoresistive elements for deriving two output signals whose phases are shifted from each other; and means connected to said means to produce a differential output signal as a detection output signal representing the relative displacement.

2. An apparatus according to claim 1, wherein said at least two magnetoresistive elements are aligned side by side in said direction perpendicular to the direction of the magnetization pattern.

3. An apparatus according to claim 1, wherein said at least two magnetoresistive elements are shifted also in the direction of the magnetization pattern.

4. An apparatus according to claim 2, wherein said magnetic record medium comprises first and second magnetic tracks which are arranged in parallel with each other and have first and second magnetization patterns, respectively shifted in the direction of the tracks by a distance equal to a half of a pitch of the magnetization pattern, and first and second magnetoresistive elements are arranged opposite to the first and second magnetic tracks, respectively.

5. An apparatus according to claim 4, wherein said first and second magnetoresistive elements are connected with each other at their one ends, the other ends of the first and second magnetoresistive elements are connected to positive and negative voltage sources, respectively, and said detection output signal is derived from a junction point between said first and second magnetoresistive elements as the differential output signal.

6. An apparatus according to claim 4, further comprising third and fourth magnetoresistive elements arranged on the first and second magnetoresistive elements, respectively via insulating members, wherein said third and fourth magnetoresistive elements are connected in series with each other between said positive and negative voltage sources, and a junction point between the first and second magnetoresistive elements and a junction point between the third and fourth magnetoresistive elements are connected to positive and negative inputs, respectively of a differential amplifier having an output from which is derived said detection output signal.

7. An apparatus according to claim 1, further comprising means for magnetically biasing said at least two magnetoresistive elements in opposite directions to each other.

8. An apparatus according to claim 7, wherein said biasing means comprises conductive members applied on the magnetoresistive elements via insulating members and a voltage source connected to the conductive members for flowing a biasing current through the conductive members.

9. An apparatus according to claim 7, wherein said magnetoresistive elements comprise first, second, third and fourth magnetoresistive elements arranged such that the first and third magnetoresistive elements are superimposed upon each other via an insulating member, the second and fourth magnetoresistive elements are superimposed upon each other via an insulating member, and the first and third magnetoresistive elements are shifted with respect to the second and fourth magnetoresistive elements in said direction, whereby said first and third magnetoresistive elements are mutually biased magnetically by passing a driving current therethrough and the second and fourth magnetoresistive elements are mutually biased magnetically by passing a driving current therethrough.

10. An apparatus according to claim 9, wherein said first, second, third and foruth magnetoresistive elements are connected into a bridge circuit and diagonal points of the bridge circuit are connected to positive and negative inputs, respectively of a differential amplifier which produces said detection output signal at its output.

11. An apparatus according to claim 9, wherein said first and second magnetoresistive elements are formed by patterning a first magnetoresistive film applied on a substrate and said third and fourth magnetoresistive elements are formed by patterning a second magnetoresistive film applied on the first magnetoresistive film via an insulating film.

12. An apparatus according to claim 11, wherein said insulating film is constituted by two insulating layers made of different insulating material.

13. An apparatus according to claim 11, wherein said substrate is made of silicon, and said first magnetoresistive film is applied on the substrate via an insulating film.

14. An apparatus according to claim 11, wherein said first, second, third and fourth magnetoresistive elements are so connected to terminals by means of patterned conductive members that a resistance value of respective magnetoresistive elements can be measured separately.

* * * * *